(12) United States Patent
Little et al.

(10) Patent No.: US 12,267,403 B2
(45) Date of Patent: Apr. 1, 2025

(54) METHOD AND SYSTEM TO IMPLEMENT PROXYING FOR OPERATIONS THROUGH AN APPLICATION PROGRAM FOR A TRANSACTION MANAGER

(71) Applicant: Oracle International Corporation, Redwood Shores, CA (US)

(72) Inventors: Todd Little, Lafayette, CO (US); Zhenyu Li, Palo Alto, CA (US); Shun Li, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/647,447

(22) Filed: Jan. 7, 2022

(65) Prior Publication Data
US 2023/0224376 A1 Jul. 13, 2023

(51) Int. Cl.
*H04L 67/562* (2022.01)
*G06F 9/46* (2006.01)

(52) U.S. Cl.
CPC ............ *H04L 67/562* (2022.05); *G06F 9/466* (2013.01)

(58) Field of Classification Search
CPC ..................................................... G06F 9/466
See application file for complete search history.

(56) References Cited

U.S. PATENT DOCUMENTS

| | | |
|---|---|---|
| 2005/0125445 A1 | 6/2005 | Cotner et al. |
| 2005/0262182 A1 | 11/2005 | Thole |
| 2011/0078516 A1* | 3/2011 | El-Kersh ................. G06F 9/466 714/48 |
| 2011/0185360 A1* | 7/2011 | Mitchell ................ G06F 9/466 718/101 |
| 2013/0151889 A1 | 6/2013 | Markus |
| 2013/0268503 A1* | 10/2013 | Budithi ................. G06F 16/235 707/703 |
| 2015/0082326 A1* | 3/2015 | Milliron ............. G06F 11/3089 719/318 |
| 2015/0309889 A1* | 10/2015 | Campbell ............... G06F 9/466 714/16 |
| 2016/0092318 A1* | 3/2016 | Ananthapadmanabh ..................... G06F 11/0709 714/15 |
| 2016/0103866 A1* | 4/2016 | Robinson ................ G06F 9/466 707/703 |
| 2016/0294726 A1 | 10/2016 | Parkinson et al. |
| 2017/0048339 A1* | 2/2017 | Straub ................. G06F 16/2379 |

(Continued)

FOREIGN PATENT DOCUMENTS

CN 115934260 4/2023

OTHER PUBLICATIONS

"Reliability through Atomicity," Atomikos, Copyright 2021.
(Continued)

*Primary Examiner* — Viet D Vu
(74) *Attorney, Agent, or Firm* — Vista IP Law Group, LLP

(57) ABSTRACT

Disclosed is an improved approach to implement the XA architecture, which permits a TM to call back to a RM via an AP. This approach avoids the need for the TM to maintain authentication/authorization credentials for each RM that will be contacted by the TM. This approach therefore also eliminates the need to establish a direct connection between the TM and the RM. An approach is also provided to integrate a traditional XA application with an XA transaction.

31 Claims, 12 Drawing Sheets

(56) References Cited

U.S. PATENT DOCUMENTS

| | | |
|---|---|---|
| 2017/0220621 A1 | 8/2017 | Colrain et al. |
| 2018/0137210 A1* | 5/2018 | Bensberg ............ G06F 16/2379 |
| 2020/0272620 A1 | 8/2020 | Zhang et al. |
| 2023/0224376 A1 | 7/2023 | Little et al. |

OTHER PUBLICATIONS

"XA and Oracle controlled Distributed Transactions," Oracle White Paper, Jun. 2010.
Janakiram, "Google's gRPC: A Lean and Mean Communication Protocol for Microservices," The New Stack, Sep. 9, 2016.
"Introduction to gRPC," dated Dec. 16, 2020.
"Jakarta Transactions," Jakarta Foundation, Page Captured May 21, 2021.
"Java ™ Transaction API (JTA): Version 1.3," Oracle, released Mar. 2018.
"Narayana Homepage: Welcome to the Narayana community!," Narayana, Page Captured on May 21, 2021.
"Distributed Transaction Processing: The TX (Transaction Demarcation) Specification," The Open Group, dated Apr. 1995.
"Distributed Transaction Processing: The XA Specification," The Open Group, dated Dec. 1991.
"Fusion Middleware Programming Resource Adapters for Oracle Weblogic Server," Oracle Webserver, copyright 2021.
"XA Transactions," Weblogic Server Components, Oracle, Copyright 2010.
Notice of Allowance for U.S. Appl. No. 17/966,461 dated Mar. 6, 2024.
Article entitled "Oracle Transaction Manager for Microservices", by Goel et al., dated May 27, 2022 (Year: 2022).

\* cited by examiner

METHOD AND SYSTEM TO IMPLEMENT PROXYING FOR OPERATIONS THROUGH AN APPLICATION PROGRAM FOR A TRANSACTION MANAGER

BACKGROUND

Various open standards have been promulgated for the implementation, management, and coordination of transactions across multiple distributed resources. For example, the XA Architecture ("eXtended Architecture") is a widely used standard released in 1991 by the X/Open consortium for handling distributed transaction processing.

XA describes the interface that is used between various entities within the XA architecture, such as an application, a transaction manager, and a resource manager. In a typical distributed transaction processing (DTP) environment as described by X/Open, the transaction manager (TM) is used to coordinate transactions that span multiple resource managers (RM), e.g., distributed database databases.

Historical implementations of the XA architecture tended to focus on a monolithic software architecture, where the use of the X/Open XA specification pertained to the interfaces between the TM and the RM with an assumption of a direct connection from the TM to the RM. The basis of this assumption is that in a monolithic software design, these two entities are both components integrated within a single larger software product.

The problem is that in a modern service oriented architecture (SOA) model, it is possible that the TM and RM entities are no longer bundled together within a single monolithic software product, but are instead separated into entities that are distinct from one another, e.g., as separate services or microservices. For communications to occur between the non-integrated TM and RM entities, this means that the TM must maintain separate credentials and a network connection for each and every RM to which it must communicate to facilitate a distributed transaction. In the circumstance where the TM needs to work with a large number of RMs, this means that an onerous amount of expense and overhead is needed to maintain all of those credentials for all of the RMs to which the TM needs to work with.

Therefore, there is a need for an improved approach for implementing the XA architecture that can be more efficiently implemented and maintained.

SUMMARY

Some embodiments of the present invention are directed to an improved approach to implement the XA architecture, which permits a TM (e.g., a "proxying TM") to call back to a RM via an application program. This approach avoids the need for the TM to maintain authentication/authorization credentials for each RM that will be contacted by the TM. This approach therefore also eliminates the need to establish a direct connection between the TM and the RM. An approach is also provided to allow a traditional XA application to participate in a distributed transaction managed by a proxying TM.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the invention are directed to an approach where proxying approach is taken to permit a transaction manager (TM) to call back to a resource manager (RM) via an application program (AP). This approach avoids the need for the TM to maintain authentication/authorization credentials for each RM that will be contacted by the TM. This approach therefore also eliminates the need to establish a direct connection between the TM and the RM.

Figure 1:
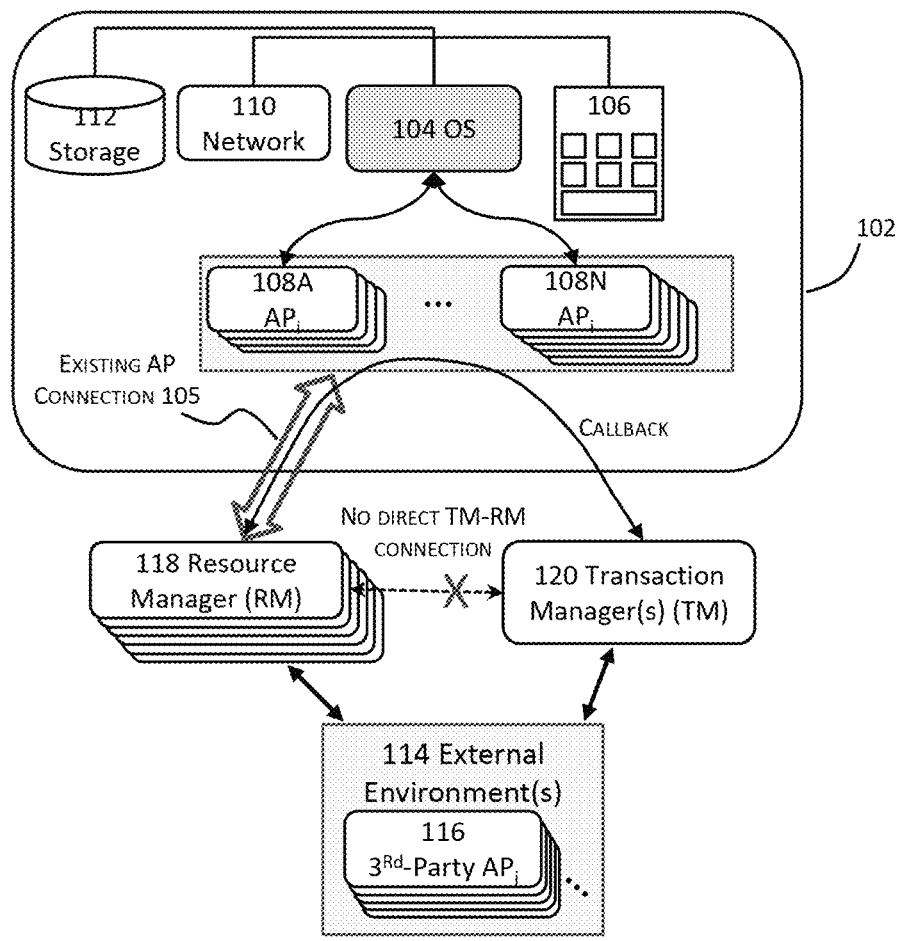
FIG. 1 provides an illustration of a system for implementing some embodiments of the invention.

FIG. 1 provides an illustration of a system for implementing some embodiments of the invention. The system includes one or more resource managers (RMs) 118. A RM manages a resource that is used by and/or accessible to a given AP. Any entity (e.g., a software entity or a client) can request access to the resource using a service provided by the RM. For instance, the RM may be embodied as a database management system (DBMS), a cache system, a messaging system, and/or any other type of resource that may be usefully accessed by an application program. In the database context, the RM controls a shared, recoverable resource that can be returned to a consistent state after a failure. Examples are relational databases, transactional queues, and transactional file systems.

An AP corresponds to an application program that engages in processing activity with respect to one or more RMs. The AP is operated with respect to transactions and will access resources within transaction boundaries for those transaction. Each AP specifies a sequence of operations that involves resources such as a database, where the database corresponds to a given RM.

The AP may be implemented within any suitable architecture model. For example, the AP may be implemented in a cloud infrastructure 102, such as the Oracle Cloud Infrastructure provided by Oracle Corporation. In a cloud computing environment, computing systems may be provided as a service to customers. One of the main reasons for the rising popularity of cloud computing is that the cloud computing model typically allows customers to avoid or minimize both the upfront costs, as well as ongoing costs, associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time. The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

Within the cloud infrastructure 102, a plurality of APs 102a-102n may be created, where each AP corresponds to a different instance of an application program. Each computing node within the cloud infrastructure 102 may correspond to any type of computing device that may be used to implement, operate, or interface with the system. Examples of such devices include, for example, workstations, personal computers, mobile devices, servers, hosts, nodes, or remote computing terminals. The computing node may include or be otherwise communicatively associated with a display device, such as a display monitor, for displaying a user interface to users. One or more input devices may be provided for the user to provide operational control over the activities of the system or AP, such as a mouse or keyboard to manipulate a pointing object in a graphical user interface to generate user inputs. The computing nodes may be associated with cloud storage mechanisms 112, a cloud communications 110, a cloud operating system (OS) 104 (or bare metal virtualization), and/or cloud processing resources 106.

The APs may also exist outside of the cloud computing context. For example, APs 116 may be located in an external environment 114. The external environment 114 corresponds any type of non-cloud location that may host an AP, such as for example, an on-premises computing system or data center.

The TM 120 is an entity that manages and coordinates global transactions, providing the processing to coordinate the decision to commit the transactions or to roll them back. The TM may also operate to coordinate the recovery process in the event of a failure.

As previously noted, historical implementations of the XA architecture placed the AP, RM, and TM as components within the same monolithic software architecture. However, it is possible that with the broad acceptance of the service-oriented architecture (SOA) in the software industry, these components may be implemented as distinct and separate services or microservices instead of being implemented as components of a single common system. Each service in an SOA embodies the components necessary to execute a discrete and defined function within the system. A microservice is a variant of the SOA concept, where the microservice is considered as a finer-grained implementation of a service. Services are typically exposed using standard network protocols such as SOAP (simple object access protocol) or REST (Representational State Transfer), where these protocols are used to send requests to read or change data. In the XA context, if the TM is implemented as a service or microservice, the protocol conforms to the XA standard as the interface for calling the TM. Any of the APs, RMs, and/or TMs may be implemented as a service or microservice according to embodiments of the invention.

The APs, RMs, and TMs may cooperate using the XA standard to perform transaction processing. A transaction is a complete unit of work where all of the operations of the transaction must be atomically performed, i.e., the transaction's operations must all be performed or none of them can be performed. The transaction's operations may include a plurality of computational tasks, such as for example data retrieval and communications. A typical transaction initiated by an AP modifies shared resources, such as the data within one or more databases managed by one or more RMs. A "commit" occurs when a decision is made to make the operations and changes of the transaction permanent. Transactions must be also able to be rolled back. For example, in the database context, the database managed by an RM may include database-related logs such as redo and undo logs to rollback a transaction. Transactions can be rolled back if a failure occurs, if a user provides an instruction to perform a rollback, and/or if a component of the system fails, keeping it from retrieving, communicating, or storing data. Every software component subject to transaction control in the XA system must be able to undo its work in a transaction that is rolled back. When the system determines that a transaction can complete without failure of any kind, it commits the transaction. This means that changes to shared resources take permanent effect. Either commitment or rollback results in a consistent state. Completion means either commitment or rollback.

The XA architecture is often used in the context of a distributed architecture, where work performed by a single transaction may occur across multiple RMs. This has several important implications, such as the fact that the system should have a way to refer to a transaction that encompasses work done throughout the distributed system, and the decisions made to commit or rollback the transaction must be done in a coordinated and uniform way across all of the affected RMs. Another common use case for the XA architecture is where multiple APs access a single RM. XA is required in this case because most RMs only allow a single connection to access a local transaction. By making the transaction distributed, e.g., an XA transaction, the transaction context can be provided to the other APs such that they all share a common GTRID (Global Transaction Identifier), yet access the RM through separate connections.

In operation, the AP defines the start and end of a global transaction by calling a TM. The TM assigns an identifier to the global transaction, where the TM manages global transactions and informs each RM of the identified transaction on behalf of which the RM is doing work. Although RMs can manage their own recoverable work units as they see fit, each RM must accept the transaction IDs and associate them with those work units. In this way, an RM knows what recoverable work units to complete when the TM completes a global transaction.

For the TM to be able to manage the transaction-related work among the RMs involved with the transactions, the TM must be able to communicate with each RM to which it is associated. Consider, however, the situation where the TM is configured as an external entity from the RM, e.g., where the TM is implemented as a service or microservice distinct from the RMs. In this circumstance, the TM would need the appropriate credentials to be able to perform authentication and/or obtain authorization with each pertinent RM, and to then establish a separate connection with those RMs. Given that there may potentially be an enormous number of RMs that need to interact with the TM, this may require a significant amount of expense and effort to maintain all of the necessary credentials for all of the RMs to which the TM needs to work with.

With embodiments of the invention, the TM does not need to establish a direct communications connection to the RMs. Instead, some embodiments of the invention operate with recognition that the AP that initiates the transaction already created an open connection 105 established with each respective RM that is associated with the transaction. Therefore, a proxy mechanism can be provided via the AP, where the proxy mechanism allows the TM to call back through the AP to the RM to perform any necessary XA-related operations for the transaction. It is noted that this is not a requirement of all embodiments of the invention, since it is possible for a non-participant in the transaction to be the initiator. It can call the TM to start a transaction and get a transaction identifier that it passes to other services that enlist in the transaction, yet not enlist in the transaction itself.

This approach therefore provides numerous advantages and benefits. First, the TM does not need to maintain any separate set of credentials for the RM, and the TM further does not need to establish its own separate connection. This provides numerous savings in resources as well as avoiding the need to obtain and maintain credentials for the TM with respect to each of the RMs. In addition, this approach saves the expense of having to create additional network connections. Moreover, when the AP and TM use separate credentials, the separate credentials make tracing the caller of the transaction more difficult as well as limiting the capabilities of the RM's authentication/authorization facilities. However, when the TM is performing a callback through the AP, this allows more effective tracing of the transaction operations since the AP and TM may effectively be using the same credentials. In some situations, it is up to the implementation to decide how deal with credentials, e.g., where the callbacks provided by the AP could propagate those credentials or identities to the RM, or instead just use the credentials the AP already has for the RM.

Figure 2:
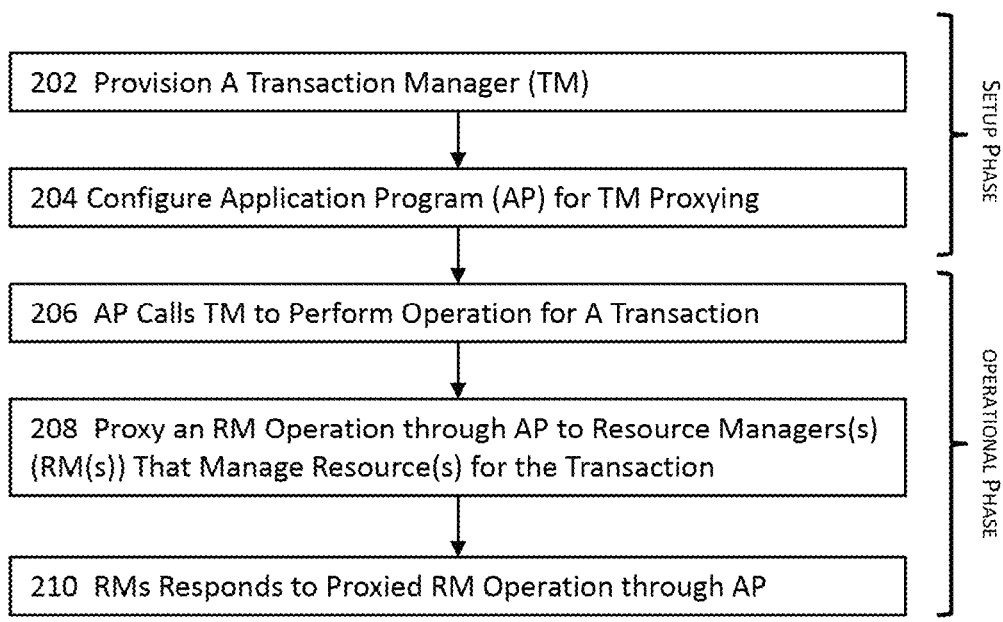
FIG. 2 shows a flowchart of an approach to implement some embodiments of the invention.

FIG. 2 shows a flowchart of an approach to implement some embodiments of the invention. During a setup phase, a transaction manager is provisioned at step 202 that is configured for proxying through an AP. The TM may be implemented as a service or microservice, and contacted/accessed using an API from an AP. Any suitable API implementation may be configured into the TM. For example, a REST interface may be provided in some embodiments. In an alternate embodiment, the TM may be implemented with a GRPC-based API. In another alternate embodiment, a messaging system could be used in place of REST or GRPC, which allows event driven applications to use embodiments of the invention. As described herein, the TM is configured to perform a callback through the AP to implement transaction processing, rather than opening a separate connection to the RMs.

At step 204 an AP is configured for TM proxying. The setup actions are facilitated by implementing an API (applications programming interface) library, with the functionality for proxying built into the operations underlying the API, and facilities for using the API are built both into the TM and the APs. In a conventional TM, a standard XA switch may exist between the TM and the RM, as each RM may provide a library for the TM to have a direct connection to the RM. With the current embodiment of the invention, an XA switch is in effect added between the TM and the AP, e.g., by implementing a modified XA library that provides for this functionality. The XA switch defines capabilities of the RM as well as functions that are to be called with respect to the RM.

A database provider may generally provide an XA library to perform XA transactions within a distributed system. The XA library is used in the AP to interact with a TM, where the XA library conforms to the X/Open distributed transaction processing (DTP) XA interface specification. The X/Open DTP architecture defines a standard architecture or interface for XA that, as previously noted, allows multiple application programs to share resources, provided by multiple, and possibly different, resource managers. The standard also coordinates the work between application programs and resource managers into global transactions.

For example, the XA library interface may be used to implement the two-phase commit protocol, consisting of a prepare phase and a commit phase, to commit transactions. In phase one, the prepare phase, the TM asks each RM to guarantee the ability to commit any part of the transaction. If this is possible, then the RM records its prepared state and replies affirmatively to the TM. If it is not possible, then the RM may roll back any work, reply negatively to the TM, and forget any knowledge about the transaction. The protocol allows the application, or any RM, to cause the rollback of the transaction unilaterally until the prepare phase is complete. In phase two, the commit phase, the TM records the commit decision. Then the TM issues a commit or rollback to all RMs which are participating in the transaction.

The XA library may include any interface routines as appropriate, such as one or more of the following: (a) "xa_open", which is used to connect to the resource manager; (b) "xa_close", which is used to disconnect from the resource manager; (c) "xa_start", which is used to start a new transaction and associate it with the given transaction ID (XID), or associate the process with an existing transaction; (d) "xa_end", which is used to disassociate the process from the given XID; (e) "xa_rollback", which is used to rollback the transaction associated with the given XID; (f) "xa_prepare", which is used to prepare the transaction associated with the given XID, and is the first phase of the two-phase commit protocol; (g) "xa_commit", which is used to commit the transaction associated with the given XID, and is the second phase of the two-phase commit protocol; (h) "xa_recover", which is used to retrieve a list of prepared, heuristically committed or heuristically rolled back transaction; and/or (i) "xa_forget", which is used to forget the heuristic transaction associated with the given XID.

For embodiments of the invention, additional extensions for the XA library are used to implement the proxying mechanism. For example, using the XA library to perform a distributed transaction will create a URI (e.g., a URL) that is associated with the AP, where the URI provides a callback path to the AP from the TM. In effect, the TM can use the URI to call back to the AP for TM to RM communication, which allows the TM to use the AP as an AP endpoint to access the RMs. This URI could be associated with the same AP associated with the transaction, or to any AP that can handle proxy requests from the TM to the RM. This additional information can be carried out-of-band in headers, or by extending the existing APIs to pass along this additional URI. It is noted that this aspect of the invention may be illustratively explained in this disclosure with respect to the creation of a URL that is associated with the AP, with the understanding that the invention is not limited to URLs and indeed may be implemented using any suitable URI.

During an operational/execution stage, the AP performs transaction-related operations that require the AP to open a connection to the RM. For example, within the X/Open DTP model, the AP may communicate to the RM using the RM's native interface (e.g. SQL) for implementing data manipulation language (DML) operations. This is in contrast to the communications between the AP and the TM, where the AP communicates to the TM using the "TX" protocol to demarcate transaction boundaries. TX refers to an interface specification by which an AP calls to a TM to demarcate a global transaction and to direct completion of the transaction. For example, when the AP calls the TX-based operation "tx_begin( )", the TM operates to inform the participating RMs of the start of a global transaction. After each request is completed, the TM provides a return value to the AP reporting back the success or otherwise of the TX call. This TX interface used for AP-TM interaction is in contrast to the above-described XA interface which is used for TM-RM interactions, which allows the TM to structure the work of RMs into global transactions and coordinate completion or recovery. The XA interface is the bidirectional interface between the TM and RM.

It is noted that the TX protocol has a number of different "standard" protocol implementations or types, such as for example, XATMI (Tuxedo based), TxRPC (DCE based) and XCPI-C (IBM Encina based). As described in more detail below, not all of these implementations may be supported by any given TM, and thus the additional embodiments described in more detail later in this document below provides a mechanism to resolve any incompatibilities.

To open a connection between the AP and a RM, the AP must undergo an authentication/authorization process relative to the RM. As such, the necessary credentials are maintained for the AP to be able to open a connection and access the RM. Any suitable approach can be taken to implement authentication/authorization for the AP to access the RM. For example, each service may integrate with an TAM (identity and access management) component for authentication and authorization, e.g., with respect to any interface such as a Console, SDK or CLI, and/or REST API. One or more policies may be configured to control access to specific service, resources, and/or types of access. For example, the policies control who can create new users, create and manage the cloud network, launch instances, create buckets, download objects, etc.

The main point to note is that the AP already maintains credentials to access the RM in order to perform its database processing. With embodiments of the invention, the TM can take advantage of using those existing credentials and existing open connections that already exist for the AP, and therefore will not need to maintain its own separate credentials or connections.

At step 206, the AP may call the TM in order to perform an operation for a transaction. Any of the previously described TX operations may be implemented by this call from the AP to the TM. For example, the AP may be calling the TM to initiate or commit a transaction.

As already noted, when the AP is enlisting in a distributed transaction, a URI/URL will be created that is associated with the AP, where the URI/URL provides a callback path to the AP from the TM. Therefore, when the AP makes a call to the TM to commit a transaction, the AP may perform a PUT on the URI/URL, passing the GTRID as part of the URI.

At step 208, the TM will use the proxy mechanism to communicate to the RMs. This can be implemented by having the TM call the URL that was provided by the AP. In effect, when a TM entity accesses the URL, this connects the TM to the AP for using the built-in proxying feature of the XA library, where a message otherwise intended for a given RM will instead be sent to the AP along with an identification of the intended RM for that message.

The callback will cause the AP to pass the TM's call over the AP's own connection and with the AP's own credentials to the RM. The message will be in the TX protocol interface rather than the normal interface such as SQL that the AP normally uses to communicate with the RM. The AP is able to provide the message using the TX interface since the AP is already configured to use the TX interface to communicate with the TM.

The RM will receive the TX interface message from the AP that was originally sent by the TM. The RM will then undertake the RM operations instructed by the message sent from the TM that was proxied through the AP. To the extent the RM needs to pass any messages back to the TM, those messages will, at step 210, be sent through the AP over the same connection to be proxied to the TM. It is noted that this approach is used in conjunction with a connection oriented interface, and that an alternative embodiment may also be implemented using non-connection oriented interfaces such as queuing systems.

Figure 3A:
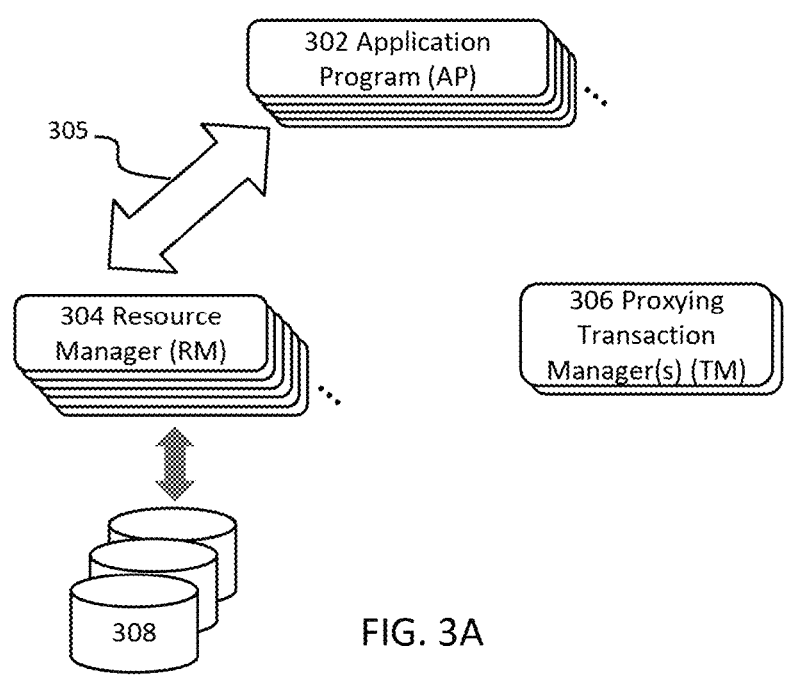
FIGS. 3A-E provide an illustrative example of some embodiments of the invention.

FIGS. 3A-E provide an illustrative example of some embodiments of the invention. FIG. 3A shows one or more APs 302 that interact with RMs 304, where the RMs 304 may manage data that is stored on one or more storage devices 308. TMs 306 are provided to coordinate and manage XA-related transaction functionality. The TM assigns identifiers to transactions, monitors their progress, and takes responsibility for transaction completion and for failure recovery. The TMs will manage global transactions, coordinate the decision to commit them or roll them back, and coordinate failure recovery. It is noted that in the current embodiment, there are likely to be a potentially large number of APs 302 and RMs 304 in the architecture, but very few TMs.

An example scenario could be a banking context, where the APs are many local branch or teller applications, and the RMs are various banking-related databases for depositor information and accounts. Each of the APs may correspond to a banking application that is operated by a bank teller to perform operations in the bank database, where the AP engages in database-related operations (e.g., SQL operations) to query, update, insert, or delete data from one or more database tables managed by the RMs. To perform these operations, the AP has already established an authenticated connection 305 between the AP and the RM.

Figure 3B:
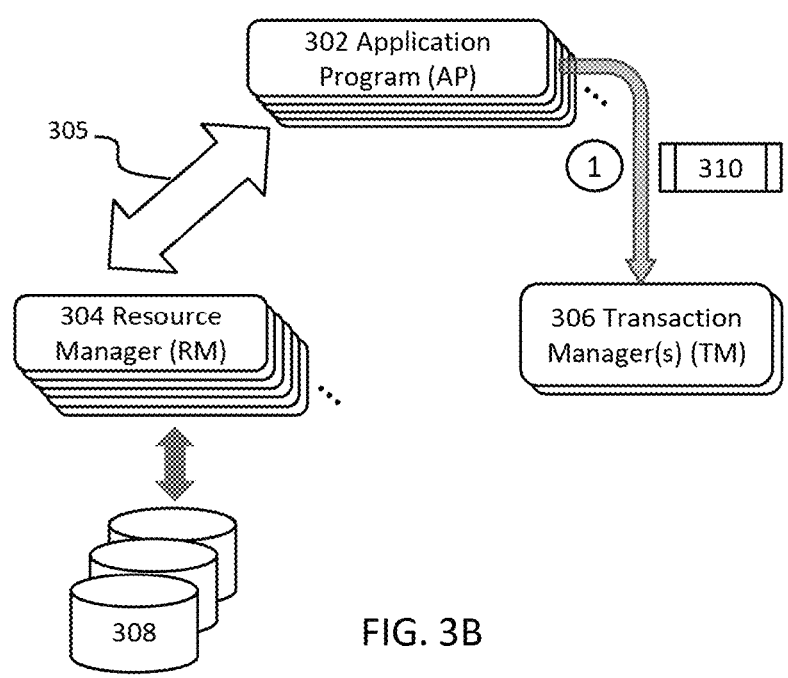

As shown in FIG. 3B, the AP may contact the TM to perform a transaction-related function. At step 1, the figure shows the AP calling the TM to, for example, define the start or end of a transaction using call 310. The AP may use resources from the set of RMs 304 to perform operation(s), where each AP specifies a sequence of operations that involves resources such as terminals and databases. AP defines transaction boundaries and specifies actions that constitute a transaction. The AP also sends links (e.g., URLs) together with requests to TM 306 for TM 306 to call back. The RMs may include databases, for example, JMS (Java message service) system, functions/methods for managing the resource, etc.

The TM handles the call from the AP by generating coordination instructions and messages 312 for the RMs. For example, the TM may use the messages to: (1) ask each RM whether it has encountered any problems with committing the transaction; and (2) if any RMs object to committing the transaction, to inform the TM so that all work done by any party on any resource involved in the transaction is rolled back; (3) if no RMs object to committing, the TM calls for a commit( ) on each of the enlisted resources.

Figure 3C:
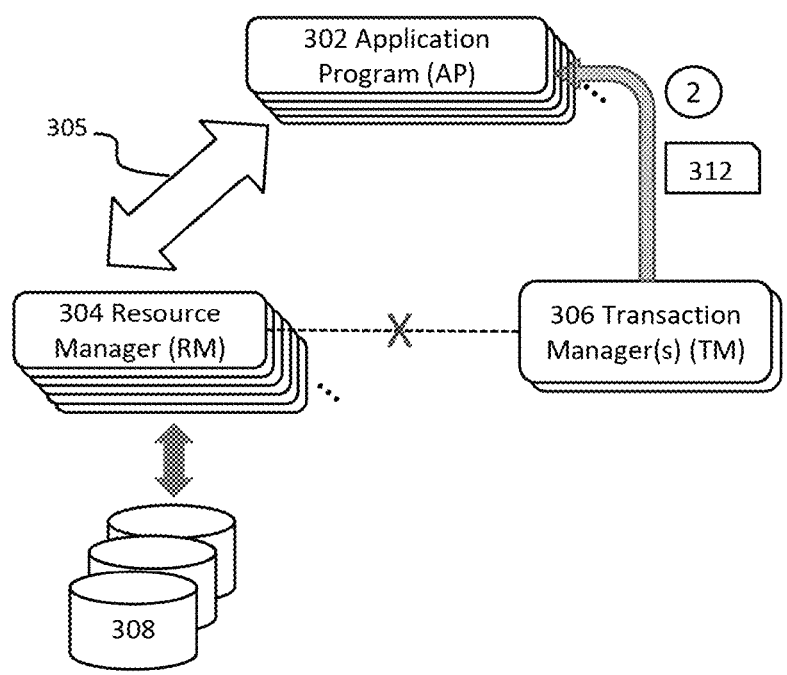

As shown in FIG. 3C, with the current embodiments the TM does not establish a direct connection to the RMs. Instead, at step 2, the TM 306 calls back to the AP 302 to pass the communications between the TM and the RM. The callback is implemented using the URL link that was provided by the AP in its call to the TM.

Figure 3D:
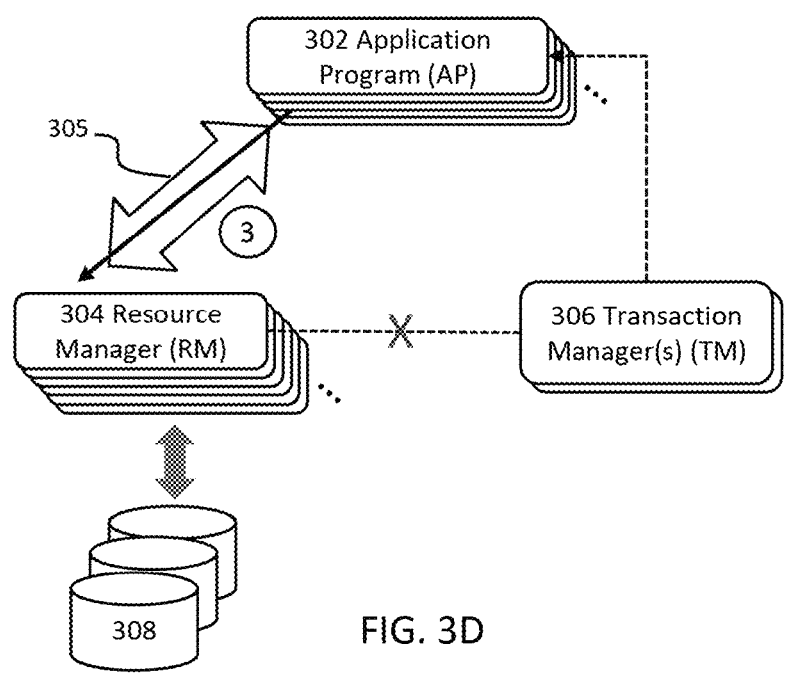

As shown by step 3 in FIG. 3D, the AP acts as a proxy for the TM to communicate to the RM. Here, the messages sent by the TM are transmitted to the RM over the existing connection 305 between the AP and the RM. For example, the AP that is performing the proxying function or the TM will use the TX interface to ask each RM whether it is OK to commit the transaction.

Figure 3E:
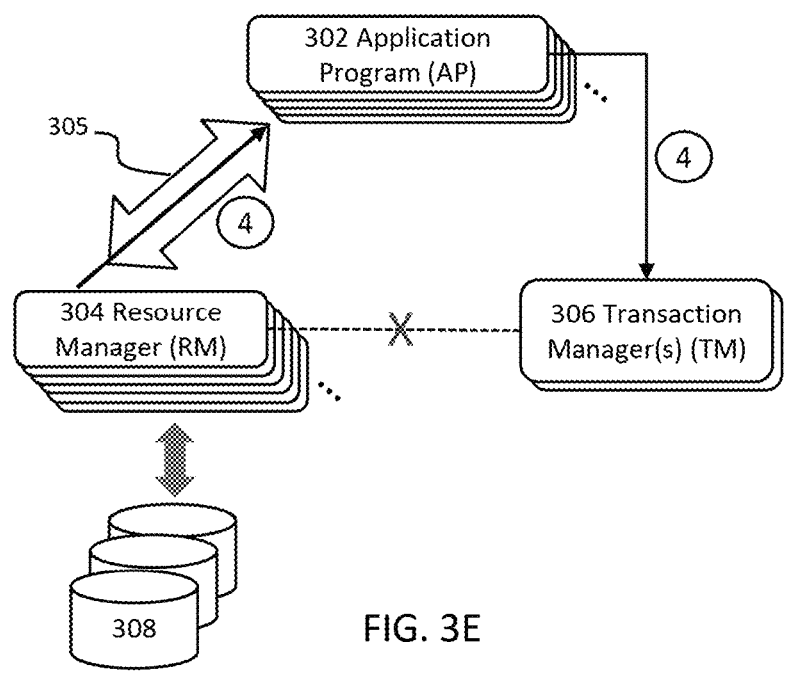

At step 4 shown in FIG. 3E, each RM responds to the call from the AP by sending the response to the TM via the open connection 305 to the AP. The response from the RM will indicate if any RMs have an objection to a commit instruction. The TM will receive the message and will provide further instructions to roll back any changes if any RMs object, or will call for a commit if there are no RMs that object to the commit operation.

This disclosure will now describe an embodiment of the invention that can include a traditional XA application with an enhanced XA transaction, e.g., to integrate the traditional XA application into a distributed transaction that is coordinated by a proxying TM as described above.

The issue addressed by this portion of the disclosure is that a traditional XA application may not be able to take advantage of the enhancements described above. This is due to several reasons. For example, as previously explained, the TX protocol has a number of different standard implementations, such as for example, XATMI (Tuxedo based), TxRPC (DCE based) and XCPI-C (IBM Encina based). Therefore, it is possible that the TM implemented as a service may not speak the same TX "language" as a legacy XA application. As such, the TM may not be able to communicate with the legacy XA application to coordinate transactions. Moreover, the legacy XA application may not be configured with the appropriate APIs to allow the TM to communicate with an embedded AP within the legacy XA application, to perform the callback operations that were previously described.

Figure 4:
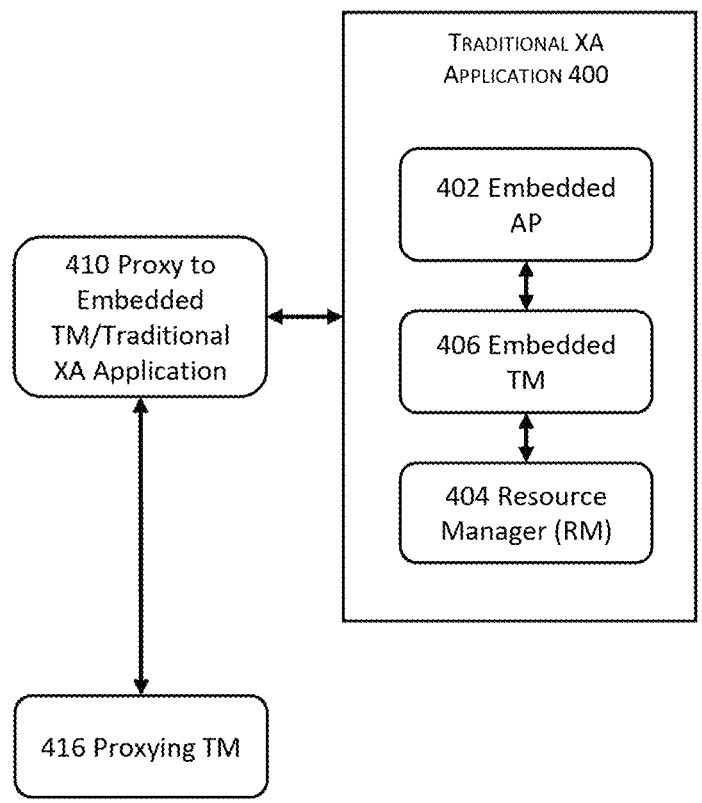
FIG. 4 shows an illustration of an architecture to allow a traditional XA application to be included in a global transaction with the proxying TM.

FIG. 4 shows an illustration of an architecture to allow a traditional XA application 400 to be included in a global transaction with the proxying TM 416. The traditional XA application 400 includes an embedded AP 402, an embedded TM 406, and a RM 404.

The new architecture include a proxy 410 to allow the traditional XA application 400 to be integrated with the global transaction coordinated by the proxying TM 416. It is noted that the term "proxying" with respect the component "proxying TM" refers to the ability of the proxying TM 416 to proxy XA-related communications through a callback to an AP as described in detail above with respect to FIGS. 1-3. That proxying function to perform a callback through an AP may be performed independently of the implementation of the proxy 410, where the proxy 410 performs a different type of proxying function to allow integration of the proxying TM with a traditional XA application—even where the traditional XM application does not include built-in facilities to perform a callback from the proxying TM to an AP.

The proxy 410 performs several functions in this architecture. First, the proxy is configured to communicate to the internal components of the traditional XA application 400 on behalf of the proxying TM 416. If the traditional XA application 400 natively uses a variant of the XA protocol different from the proxying TM 416, then the proxy will apply the appropriate translations required to generate instructions in a XA variant understandable in either direction. Second, the proxy 410 invokes sub-transactions within the traditional XA application 400 to effect its part of a global transaction.

Figure 5:
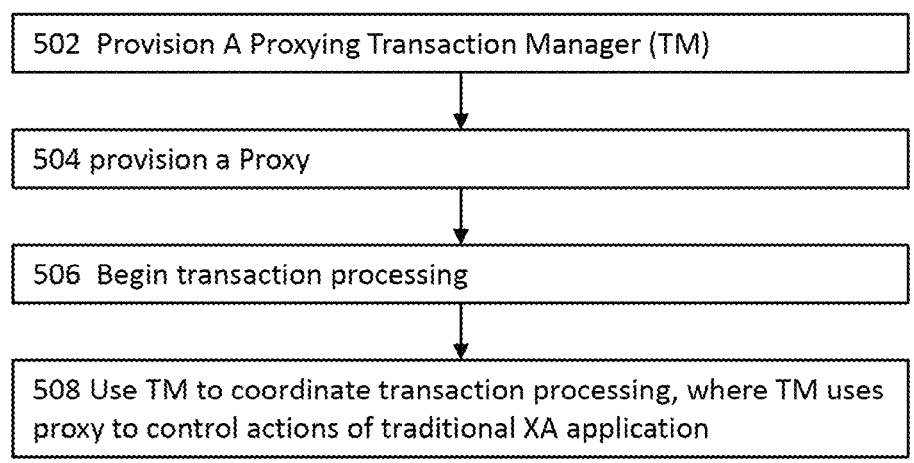
FIG. 5 shows a flowchart of an approach to allow a traditional XA application to be included in a global transaction with the proxying TM.

FIG. 5 shows a flowchart of an approach to allow a traditional XA application to be included in a global transaction with the proxying TM. At 502, a proxying TM is provisioned, e.g., using the techniques described above in the previous section. Next, at 502, a proxy is provisioned. The proxy component is inserted in-between the proxying TM and the traditional XA application. In one embodiment, the proxy resides within the traditional XA application. In an alternate embodiment, the proxy is provisioned outside of the traditional XA application, e.g., as its own service or microservice.

At 506, the global transaction processing is initiated. For example, a client may begin a global transaction by invoking a service embodied as a traditional XA application. The client may additionally invoke any number of other services as part of the global transaction, where the other services are embodied as either traditional XA applications or proxying XA applications.

The proxying TM then proceeds with coordination of the global transaction at step 508. With regard to any enhanced/proxying applications, the proxying TM will directly communicate with those proxying applications to perform the transaction processing, e.g., by implementing callbacks through the enhanced, proxying applications to communicate with RMs.

With regards to any traditional XA applications, the proxying TM will coordinate the activities of the traditional XA application using the proxy component. In particular, the proxy will act on behalf of the proxying TM to initiate and execute a sub-transaction within the traditional XA application.

The sub-transaction within the traditional XA application is handled the same way any previous transaction would be otherwise handled within the traditional XA application prior to the existence of the proxying TM, and thus processing of the sub-transaction is within the scope of capacity for the traditional XA application. The main difference is that the sub-transaction is acting on behalf of the proxying TM to perform the transaction-related functions instructed by the proxying TM based upon the proxying TM's overall control and insight into the actions of the different applications and RMs involved with global transaction.

Figure 6:
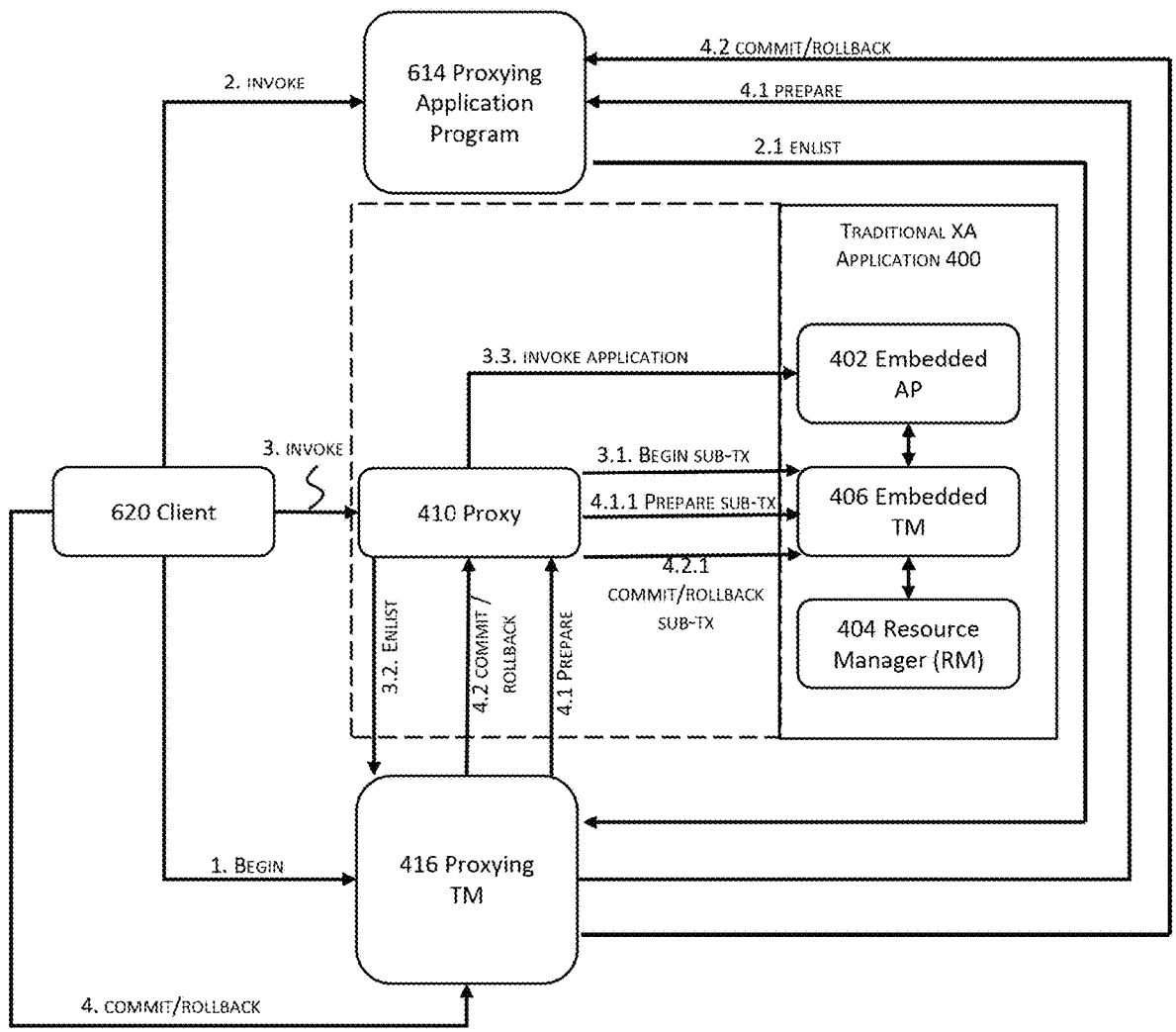
FIG. 6 provides an illustration of an architecture for implementing a global transaction involving both a traditional XA application and an enhanced, non-traditional application.

FIG. 6 provides an illustration of how this works in a global transaction involving both a traditional XA application 400 and an enhanced, non-traditional application 614. The processing starts at step 1 when the client 620 initiates a global transaction by issuing the appropriate call to the proxying TM 416. At step 2, the client invokes the proxying AP 614, which is an AP that is capable of implementing the proxying/callback approach to communicate between the proxying TM and a RM. Therefore, the AP 614 will, at step 2.1, enlist the transaction to the global transaction by calling the proxying TM 416, e.g., using one of the XA library calls described above.

For the traditional XA application 400, there may not be any way to directly communicate between the traditional XA application 400 and other components of the system, such as the proxying TM 416. This is because, as noted above, the traditional XA application 400 may not have been configured to be able to directly communicate with the proxying TM, or indeed to even have the concept of an external TM if the traditional XA application 400 was developed as a monolithic application.

Therefore, at step 3, the client 620 will invoke the traditional XA application 400 via the proxy 410. The dashed border around proxy 410 indicates that the proxy 410 may be implemented either as a subcomponent within the traditional XA application 410 or as a separate component, service, or microservice that is external to the traditional XA application 400.

At 3.1, the proxy 410 invokes the embedded TM 402 within the traditional XA application 400 to begin a sub-transaction. At 3.2, the proxy 410 will call back to the proxying TM 416 to enlist the sub-transaction to the global transaction. Afterwards, at step 3.3, the proxy 410 invokes the embedded AP to perform the appropriate actions for the transaction.

At a later point in time, a decision may need to be made to commit or roll back the global transaction. The user may provide an instruction to either commit or roll back the global transaction.

At step 4, the client 620 calls the proxying TM 416 to commit or roll back the global transaction. At 4.1, the proxying TM 416 sends a request to the proxy to prepare the transaction. In response, the proxy at 4.1.1 will ask the embedded TM 406 to prepare the sub-transaction. Also at 4.1, the proxying TM 416 will send a request to the AP 614 to prepare the transaction.

At 4.2, with regards to the traditional XA application, the proxying TM 416 will request the proxy 410 to commit or roll back the transaction. This is followed at 4.2.1 by the proxy 410 asking the embedded TM 406 to commit or roll back the sub-transaction. With regards to the AP 614, at 4.2, the proxying TM 416 will directly communicate with/through the AP 614 to commit or roll back the global transaction.

Therefore, what has been described is an improved approach to implement the XA architecture, which permits a TM to call back to a RM via an AP. This approach avoids the need for the TM to maintain authentication/authorization credentials for each RM that will be contacted by the TM. This approach therefore also eliminates the need to establish a direct connection between the TM and the RM. An additional embodiment provides an approach to integrate a traditional XA application with an enhanced XA transaction.

System Architecture Overview

Figure 7:
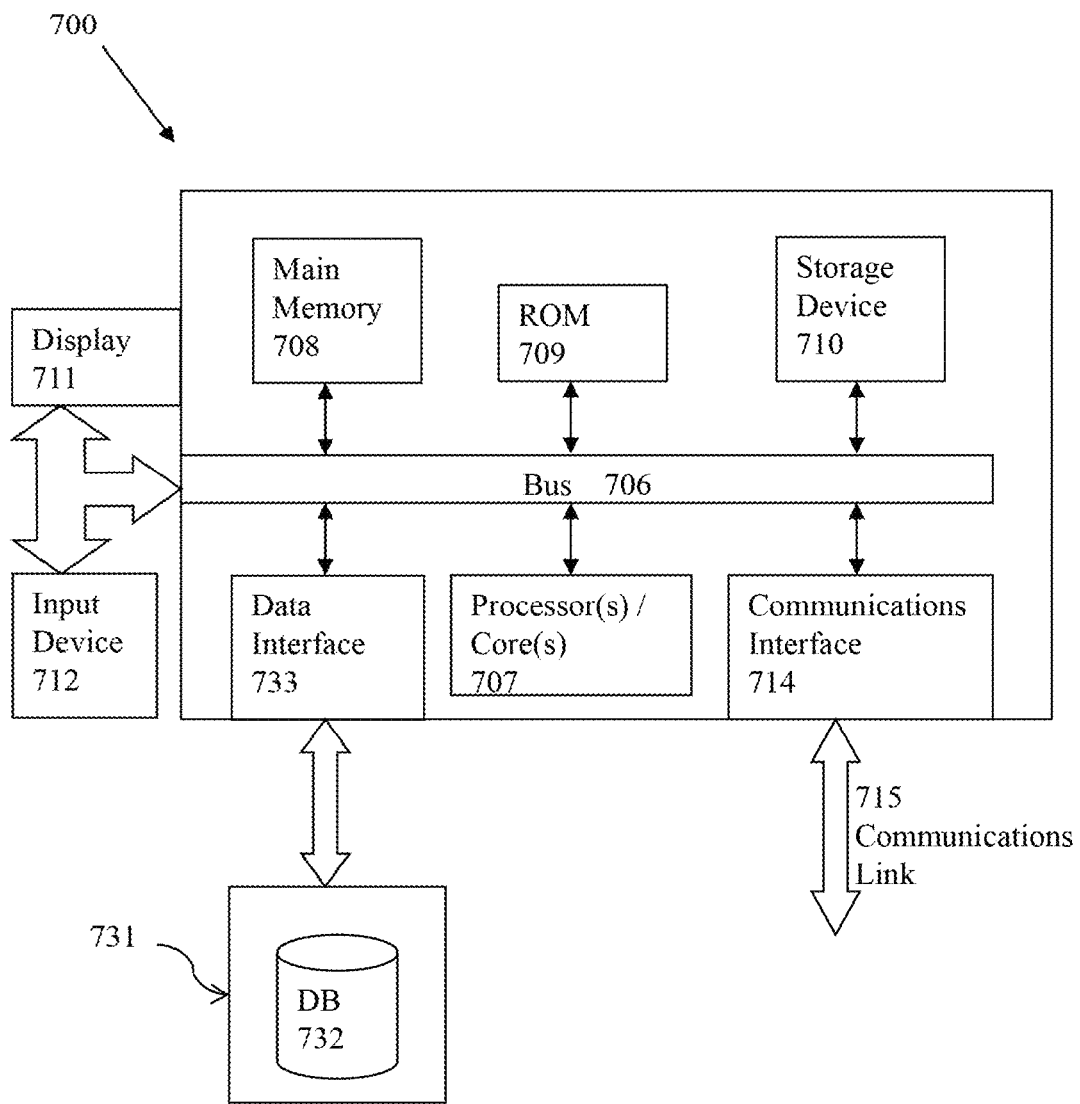
FIG. 7 is a block diagram of an illustrative computing system suitable for implementing an embodiment of the present invention.

FIG. 7 is a block diagram of an illustrative computing system 700 suitable for implementing an embodiment of the present invention. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. Data may be accessed from a database 732 that is maintained in a storage device 731, which is accessed using data interface 733.

Figure 8:
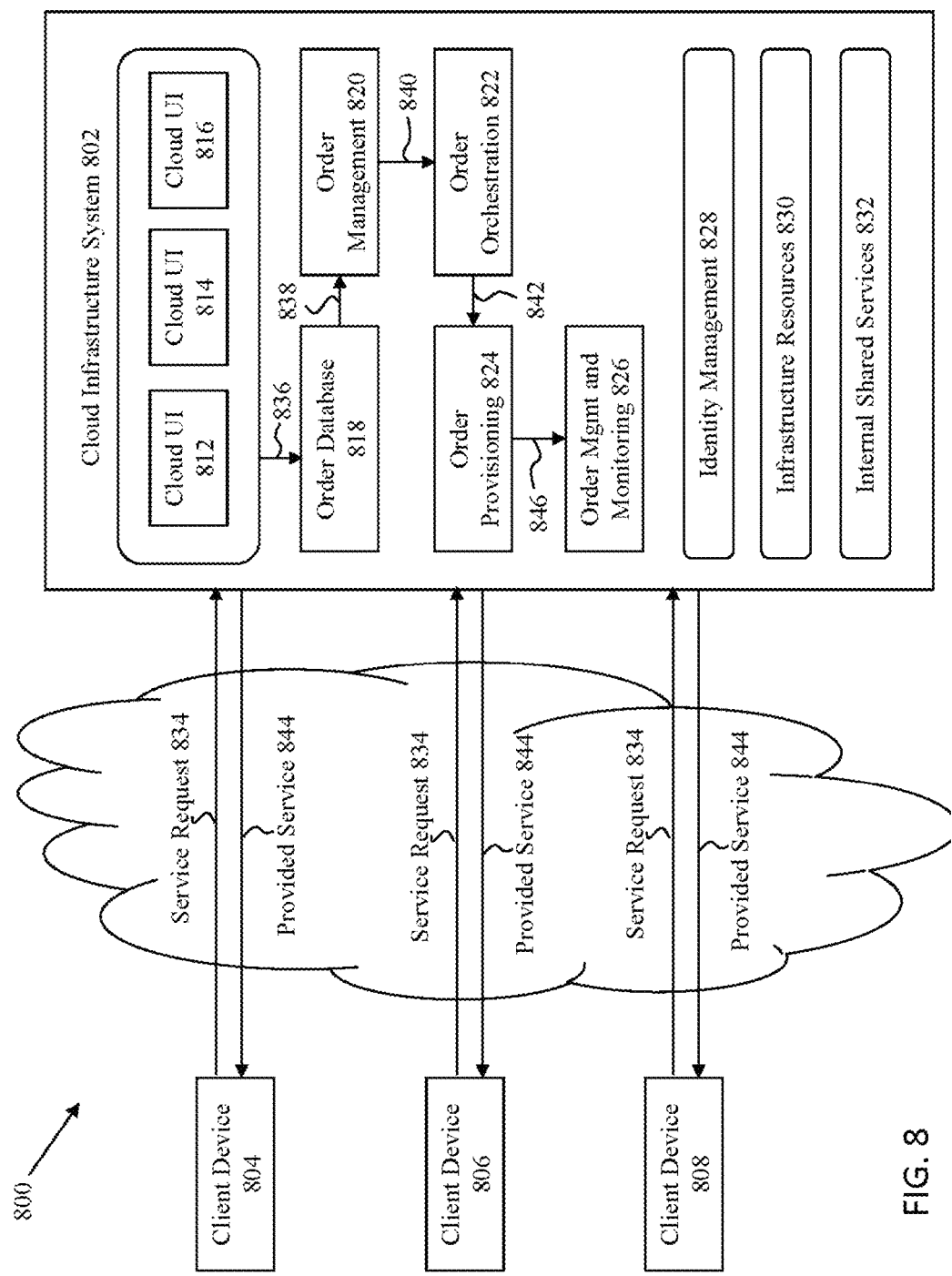
FIG. 8 is a block diagram of one or more components of a system environment in which services may be offered as cloud services, in accordance with an embodiment of the present invention.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

We claim:

1. A computer implemented method, comprising:
  identifying a transaction manager (TM) located on a first computing node that is external to both an application program (AP) located on a second computing node and a resource manager (RM), wherein the TM that is external and connected to the AP via a first network connection is implemented as a separate service from the AP that is located on the second computing node and is operable to coordinate a commit or a rollback for a transaction that operates against a database at the RM;
  in response to a request from a client computing node for performing an operation for the transaction, receiving a call at the TM from the AP via at least the first network connection to perform the operation for the transaction;
  determining, at the TM, an instruction for an RM operation that is to be sent from the TM to the RM to implement the operation for the transaction; and
  transmitting the RM operation from the TM located at the first computing node to the AP located at the second computing node and then from the AP to the RM via a second network connection between the AP and the RM, without requiring a network connection that directly links the TM and the RM for transmitting the RM operation from the TM to the RM.

2. The method of claim 1, wherein the RM operation is proxied through the AP from the TM to the RM by implementing a callback operation from the TM, via at least the first network connection, to the AP.

3. The method of claim 2, further comprising:
  creating a URL (universal resource locator) that is associated with the AP for the transaction, wherein the TM accesses the URL to call back to the AP to implement transmitting the RM operation to the RM through the AP.

4. The method of claim 1, wherein the RM operation is transmitted through the AP from the TM to the RM through at least the second network connection linked to an existing connection between the AP and the RM that is used to implement one or more SQL operations.

5. The method of claim 1, wherein the TM comprises a service or microservice in a SOA (service oriented architecture) computing model, and the service or the microservice serves a plurality of application programs residing on a plurality of computing devices.

6. The method of claim 1, wherein the AP comprises a database application on a first computing device, the RM comprises a database management system on a second computing device, and the TM located on a third computing device transmits the RM operation through the AP to implement two-phase commit processing for one or more changes initiated by the database application at the AP that are made to the database maintained by the database management system at the RM.

7. The method of claim 1, further comprising:
  identifying a second AP that is embedded in the TM; and
  performing transaction processing from the TM though a proxy component to invoke the second AP and to implement a sub-transaction at the TM.

8. The method of claim 7, wherein the proxy component is integrated with the second AP or the TM.

9. The method of claim 1, further comprising:
  identifying a second AP that is embedded in the TM; and
  performing transaction processing from the TM though a proxy component to translate from a first transaction (TX) protocol type to a second TX protocol type.

10. The method of claim 1, further comprising:
  identifying a second AP that does not support transmitting the RM operation using a callback; and
  integrating the AP and the second AP into a single global transaction using a proxy component that receives a transaction processing instruction from the TM.

11. A computer program product comprising a non-transitory computer accessible medium storing thereupon a sequence of instructions which, when executed by a processor, causes the processor to perform a set of acts comprising:
  identifying a transaction manager (TM) located on a first computing node that is external to both an application program (AP) located on a second computing node and a resource manager (RM), wherein the TM that is external and connected to the AP via a first network connection is implemented as a separate service from the AP that is located on the second computing node and is operable to coordinate a commit or a rollback for a transaction that operates against a database at the RM;

in response to a request from a client computing node for performing an operation for the transaction, receiving a call at the TM from the AP via at least the first network connection to perform an operation for the transaction;

determining, at the TM, an instruction for an RM operation that is to be sent from the TM to the RM to implement the operation for the transaction; and transmitting the RM operation from the TM located at the first computing node to the AP located at the second computing node and then from the AP to the RM via a second network connection between the AP and the RM, without requiring a network connection that directly links the TM and the RM for transmitting the RM operation from the TM to the RM.

12. The computer program product of claim 11, wherein the RM operation is proxied through the AP from the TM to the RM by implementing a callback operation from the TM, via at least the first network connection, to the AP.

13. The computer program product of claim 12, wherein the set of acts further comprises creating a URL (universal resource locator) that is associated with the AP for the transaction, wherein the TM accesses the URL to call back to the AP to implement transmitting the RM operation to the RM through the AP.

14. The computer program product of claim 11, wherein the RM operation is transmitted through the AP from the TM to the RM through at least the second network connection linked to an existing connection between the AP and the RM that is used to implement one or more SQL operations.

15. The computer program product of claim 11, wherein the TM comprises a service or microservice in a SOA (service oriented architecture) computing model, and the service or the microservice serves a plurality of application programs residing on a plurality of computing devices.

16. The computer program product of claim 11, wherein the AP comprises a database application on a first computing device, the RM comprises a database management system on a second computing device, and the TM located on a third computing device transmits the RM operation through the AP to implement two-phase commit processing for one or more changes initiated by the database application at the AP that are made to the database maintained by the database management system at the RM.

17. The computer program product of claim 11, the set of acts further comprising:

identifying a second AP that is embedded in the TM; and performing transaction processing from the TM though a proxy component to invoke the second AP and to implement a sub-transaction at the TM.

18. The computer program product of claim 17, wherein the proxy component is integrated with the second AP or the TM.

19. The computer program product of claim 11, the set of acts further comprising:

identifying a second AP that is embedded in the TM; and performing transaction processing from the TM though a proxy component to translate from a first TX protocol type to a second TX protocol type.

20. The computer program product of claim 11, the set of acts further comprising:

identifying a second AP that does not support transmitting the RM operation using a callback; and integrating the AP and the second AP into a single global transaction using a proxy component that receives a transaction processing instruction from the TM.

21. A system for implementing a standby database, comprising:

a processor;

a memory having stored thereupon a sequence of instructions of program code, which when executed by the processor, causes the processor to execute a set of acts comprising:

identifying a transaction manager (TM) located on a first computing node that is external to both an application program (AP) located on a second computing node and a resource manager (RM), wherein the TM that is external and connected to the AP via a first network connection is implemented as a separate service from the AP that is located on the second computing node and is operable to coordinate a commit or a rollback for a transaction that operates against a database at the RM;

in response to a request from a client computing node for performing an operation for the transaction, receiving a call at the TM from the AP via at least the first network connection to perform the operation for the transaction;

determining, at the TM, an instruction for an RM operation that is to be sent from the TM to the RM to implement the operation for the transaction; and transmitting the RM operation from the TM located at the first computing node to the AP located at the second computing node and then from the AP to the RM via a second network connection between the AP and the RM, without requiring a network connection that directly links the TM and the RM for transmitting the RM operation from the TM to the RM.

22. The system of claim 21, wherein the RM operation is proxied through the AP from the TM to the RM by implementing a callback operation from the TM, via at least the first network connection, to the AP.

23. The system of claim 22, wherein the set of acts further comprises:

creating a URL (universal resource locator) that is associated with the AP for the transaction, wherein the TM accesses the URL to call back to the AP to implement transmitting the RM operation to the RM through the AP.

24. The system of claim 21, wherein the RM operation is transmitted through the AP from the TM to the RM through at least the second network connection linked to an existing connection between the AP and the RM that is used to implement one or more SQL operations.

25. The system of claim 21, wherein the TM comprises a service or microservice in a SOA (service oriented architecture) computing model, and the service or the microservice serves a plurality of application programs residing on a plurality of computing devices.

26. The system of claim 21, wherein the AP comprises a database application on a first computing device, the RM comprises a database management system on a second computing device, and the TM located on a third computing device transmits the RM operation through the AP to implement two-phase commit processing for one or more changes initiated by the database application at the AP that are made to the database maintained by the database management system at the RM.

27. The system of claim 21, the set of acts further comprising:

identifying a second AP that is embedded in the TM; and performing transaction processing from the TM though a proxy component to invoke the second AP and to implement a sub-transaction at the TM.

28. The system of claim 27, wherein the proxy component is integrated with the second AP or the TM.

29. The system of claim 21, the set of acts further comprising:
   identifying a second AP that is embedded in the TM; and
   performing transaction processing from the TM though a proxy component to translate from a first transaction (TX) protocol type to a second TX protocol type.

30. The system of claim 21, the set of acts further comprising:
   identifying a second AP that does not support transmitting the RM operation using a callback; and
   integrating the AP and the second AP into a single global transaction using a proxy component that receives a transaction processing instruction from the TM.

31. A computer implemented method, comprising:
   identifying a transaction manager (TM) located on a first computing node that is external to both an application program (AP) located on a second computing node and a resource manager (RM), wherein the TM that is external and connected to the AP via a first network connection is implemented as a separate service from the AP that is located on the second computing node and is operable to coordinate a commit or a rollback for a transaction that operates against a database at the RM;
   in response to a request from a client computing node for performing an operation for the transaction, receiving a call at the TM from the AP via at least the first network connection to perform the operation for the transaction;
   determining, at the TM, an instruction for an RM operation that is to be sent from the TM to the RM to implement the operation for the transaction;
   transmitting the RM operation from the TM located at the first computing node to the AP located at the second computing node and then from the AP to the RM via a second network connection between the AP and the RM, without requiring a network connection that directly links the TM and the RM for transmitting the RM operation from the TM to the RM; and
   performing, for the AP or a different AP, transaction processing from the TM though a proxy component to translate from a first transaction (TX) protocol type to a second TX protocol type.

* * * * *